Dec. 13, 1955 W. B. HERNDON ET AL 2,726,746
TRANSMISSION FOR AN AUTOMOTIVE VEHICLE
Filed Feb. 20, 1952 7 Sheets-Sheet 2

Inventors
Walter B. Herndon &
August H. Borman
By Barnes, Kisselle, Laughlin & Raisch
Attorneys

Dec. 13, 1955  W. B. HERNDON ET AL  2,726,746
TRANSMISSION FOR AN AUTOMOTIVE VEHICLE
Filed Feb. 20, 1952  7 Sheets-Sheet 6

INVENTORS
Walter B. Herndon &
August H. Borman
BY
Barnes, Kisselle, Laughlin & Raisch
ATTORNEYS

United States Patent Office 2,726,746
Patented Dec. 13, 1955

2,726,746

TRANSMISSION FOR AN AUTOMOTIVE VEHICLE

Walter B. Herndon, Rochester, and August H. Borman, Detroit, Mich., assignors to General Motors Corporation, Detroit, Mich., a corporation of Delaware Application February 20, 1952, Serial No. 272,566

18 Claims. (Cl. 192—3.5)

This invention relates to a transmission for an automotive vehicle.

This invention contemplates a simple and relatively inexpensive automatic transmission for an automotive vehicle. The present transmission and its control system are designed to provide for neutral, low gear, second gear, direct drive, and reverse conditions of operation. Selection of low gear and reverse is accomplished manually by means of linkage mechanism hereafter described. A hydraulic control system may be conditioned for drive range operation and when so conditioned is arranged to provide for normal second gear start with automatic upshift to direct drive without the attention of the vehicle operator. In addition, the hydraulic control system provides for automatic downshift from direct drive to second speed drive under certain conditions of vehicle operation. Also, the hydraulic control system may be set for continuous operation in second gear if such be desired by the vehicle operator.

More particularly the invention relates to a transmission which is automatically shifted from second to third speed as the torque requirements are decreased and which automatically downshifts into second speed when the torque requirement increases. A pump responsive to the speed of the vehicle acts as a governor to help determine whether the transmission should be shifted up or down and an engine driven pump delivers hydraulic power for shifting the transmission.

The invention contemplates a novel shift relay mechanism which disconnects the low and reverse driving gears from the engine driven shaft preparatory to shifting the low and reverse driven gear into mesh with either the low or the reverse driving gear whereby clashing and destruction of the gears is prevented.

The invention also contemplates a simple form of automatically operated tow valve mechanism which acts both as a pressure regulating valve and a distributor valve when the engine is being started by towing of the vehicle to engage the rear wheels in direct drive relation with the engine to start the same, the tow valve automatically being returned to inoperative position as soon as the engine starts.

Figure 1:
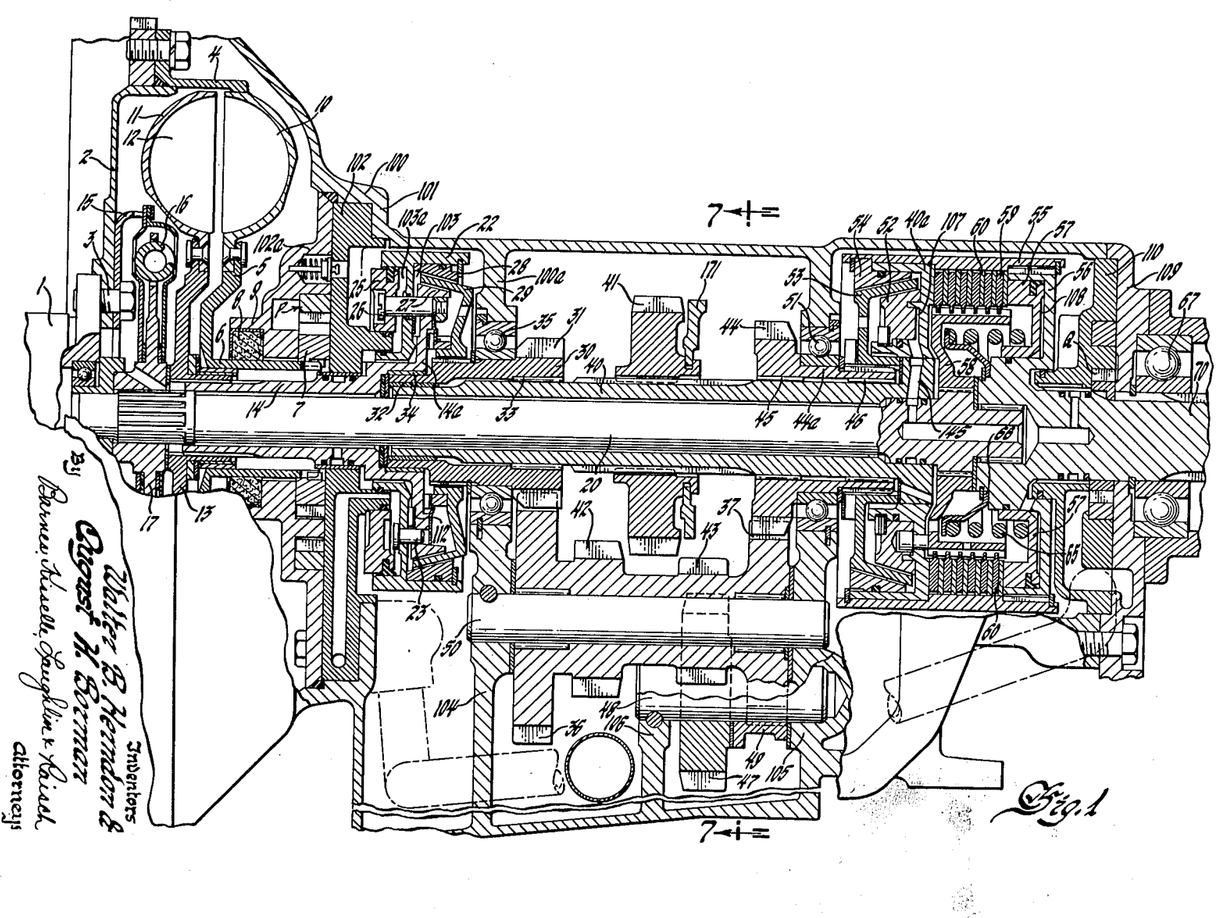
Fig. 1 is a vertical longitudinal section through the automatic transmission taken along the line 1—1 of Fig. 7.

Referring to Fig. 1 there is shown a gearing arrangement and drive coupling mechanism constructed in accordance with the principles of this invention. A crankshaft 1 driven by an engine (not shown) is bolted to a flywheel 2 by means of bolts 3, the flywheel in turn being bolted to a fluid flywheel torus drive shell or impeller 4 riveted to a torus hub 5. The hub 5 is formed to provide an axially extending sleeve 6 splined to a drive gear 7 of a pump P used to supply fluid pressure to the transmission hydraulic control system. The pump P will be operative whenever the vehicle engine is running. The transmission housing 100 is provided with an inwardly extending web 101 on which the pump P is mounted. A pump cover plate 102 mounted on web 101 closes the pump housing 102a. An oil seal 8 is positioned between sleeve 6 and an axially extending boss 9 formed on the pump housing 102a. The torus shell 4 carries a plurality of vanes 10 to form the impeller of the fluid coupling. A drum 11 carries a plurality of vanes 12 to form the driven member or rotor of the fluid coupling. Drum 11 is riveted to a hub 13, hub 13 in turn being splined to a power input shaft 14.

Flywheel 2 is connected to a direct drive power input hub 17 by means of a plate 15 fastened to flywheel 2 and connected to hub 17 by means of a vibration dampener 16. Hub 17 in turn is splined to a direct drive shaft 20. Power input shaft 14 is formed with a radial extension 14a, the extension being pinned to an axially slidable neutral clutch sleeve 22 by means of a neutral clutch drive pin 23. An axially stationary neutral clutch piston 25 is fixed to radial extension 14a by means of pins 26 which are fixed to extension 14a. Extension 14a takes the form of the outer circumferential portion of an inner conical clutch member 27 while sleeve 22 carries an outer conical backing member 28. Intermediate conical members 27 and 28 is a header gear clutch cone 29, the cone 29 being splined to an axially extending sleeve 30 formed integrally with a header gear 31. A crinkled, circular spring 112 acts between flange 14a and sleeve 22 to initially apply clutch 27, 28, 29 when chamber 103a is opened to exhaust. When fluid pressure is admitted to chamber 103, clutch sleeve 22 moves axially to the left to lock header gear clutch cone 29 to power input shaft 14 through cones 27 and 28, thereby imparting drive from the fluid coupling to the header input gear 31. When fluid pressure in chamber 103 is released and pressure applied to chamber 103a, clutch 27, 28, 29, is disengaged and no power may be transferred from the fluid coupling to the header input gear 31. Sleeve 30 is supported upon a main shaft 40 by means of bearings 32 and 33. Power input shaft 14 is supported upon sleeve 30 by means of a bearing 34. A radially extending housing web 100a carries a bearing 35 for supporting sleeve 30 adjacent header gear 31.

Splined to main shaft 40 is a low and reverse gear 41, the gear 41 being axially movable upon shaft 40 for selective engagement with a low or first speed gear 42 and with a reverse gear 43 through idler gear 47. An intermediate or second speed gear 44 is rotatably supported upon main shaft 40 by means of suitable bearings 45 and 46. A countershaft header gear 36 is constantly in mesh with header input gear 31 while countershaft gear 37 is constantly in mesh with second speed gear 44. Reverse gear 43 is constantly in mesh with a reverse idler gear 47. The gear cluster comprising gears 36, 42, 43 and 37 is formed as a unit and is supported upon a countershaft 50 carried by radially extending transmission housing webs 104 and 105. Reverse idler gear 47 is supported upon reverse idler shaft 48 carried by housing webs 105 and 106. A reverse idler shaft spacer 49 is interposed between housing web 105 and reverse idler gear 47 to maintain idler gear 47 in constant mesh with reverse gear 43. A bearing 51 supports the sleeve extension 44a of second speed gear 44 in housing web 105.

Main shaft 40 is formed at the right to include an intermediate or second speed clutch housing member 40a rotated by the main shaft 40. Member 40a is shaped to provide a cylindrical chamber 107 adapted to receive a piston 52. An intermediate gear cone clutch member 53 splined to second speed gear sleeve 44a extends between the conical face of piston 52 and a conical backing member 54 fastened to sleeve 55. Housing member 40a is keyed to sleeve 55. When fluid pressure is admitted to chamber 107 through passage 145, piston 52 locks cone clutch 53 to clutch member 54 and sleeve 55, the sleeve 55 in turn being drivingly connected to final output shaft 70 by means of radial web 56 formed on the end of shaft 70 and splined to sleeve 55.

A direct drive clutch hub 58 carrying clutch plates 59 is splined to direct drive shaft 20. Clutch plates 60 are mounted within, and splined to, sleeve 55. The radially extending web 56 is shaped to provide a cylindrical chamber 108 for receiving a piston 57. When fluid pressure is admitted to chamber 108 through passage 232 (see Fig. 2), piston 57 engages clutch plates 59 and 60, thereby connecting final output shaft 70 to direct drive shaft 20. A clutch release spring 65 seated upon a spring retainer 66 at one end and piston 57 at the other end releases the clutch plates 59 and 60 when fluid pressure is released from chamber 108. Main shaft 40 is driveably connected to output shaft 70 through member 40a, sleeve 55, and web 56 which is splined to sleeve 55.

At the rear of the transmission, the transmission housing extends radially inwardly at 109 to support a bearing 67 for final load shaft 70.

A rear pump Q, driven in response to the speed of the vehicle by load or output shaft 70, is supported upon the rear end of the transmission housing by means of a pump body 110. Pump Q normally functions as a governor for controlling the timing of the automatic shift from second gear to direct drive when the hydraulic control system hereafter described is conditioned for drive range operation, but may be used to supply pressure fluid to the transmission hydraulic control system whenever the engine pump is inoperative. Thus, pump Q may supply pressure fluid in the event that it is necessary to tow the vehicle to start the engine.

*Neutral.*—For neutral condition of operation, the neutral clutch 27, 28 and 29 is engaged, while second speed clutch 52, 53, 54 and direct drive clutch 59, 60 are released.

*Low gear.*—In low gear, low and reverse gear 41 is placed in mesh with gear 42, the neutral clutch 27, 28, 29 is applied, and intermediate and direct drive clutches are disengaged. Drive through the transmission is accomplished through the fluid coupling, neutral clutch, header input gear 31, gear 36, gears 42 and 41 to main shaft 40, extension 40a through sleeve 55, web 56 to final load shaft 70.

*Second gear.*—With the hydraulic control system, hereafter explained in detail, conditioned for drive range of operation, the neutral clutch 27, 28, 29 and intermediate clutch 52, 53, 54 are initially engaged with direct drive clutch 59—60 disengaged to provide second speed start. The low and reverse gear 41 is out of mesh with both gears 42 and 47. Drive through the transmission is accomplished by way of the fluid coupling 10, 12, neutral clutch 27, 28, 29, header gear 31, gear 36, gear 37, second speed gear 44, clutch 52, 53, 54 and sleeve 55 to load shaft 70.

*Direct drive.*—Upon automatic upshift to direct drive, the second speed clutch is released and direct drive clutch 59—60 is applied. Direct drive is thus accomplished by way of the engine flywheel 2, dampener hub 17, direct drive shaft 20, hub 58, clutch 59—60, sleeve 55, and web 56 to load shaft 70.

*Reverse.*—For reverse operation low and reverse gear 41 is placed in mesh with gear 47, the drive being similar in all other respects to that of low gear drive.

Figure 2:
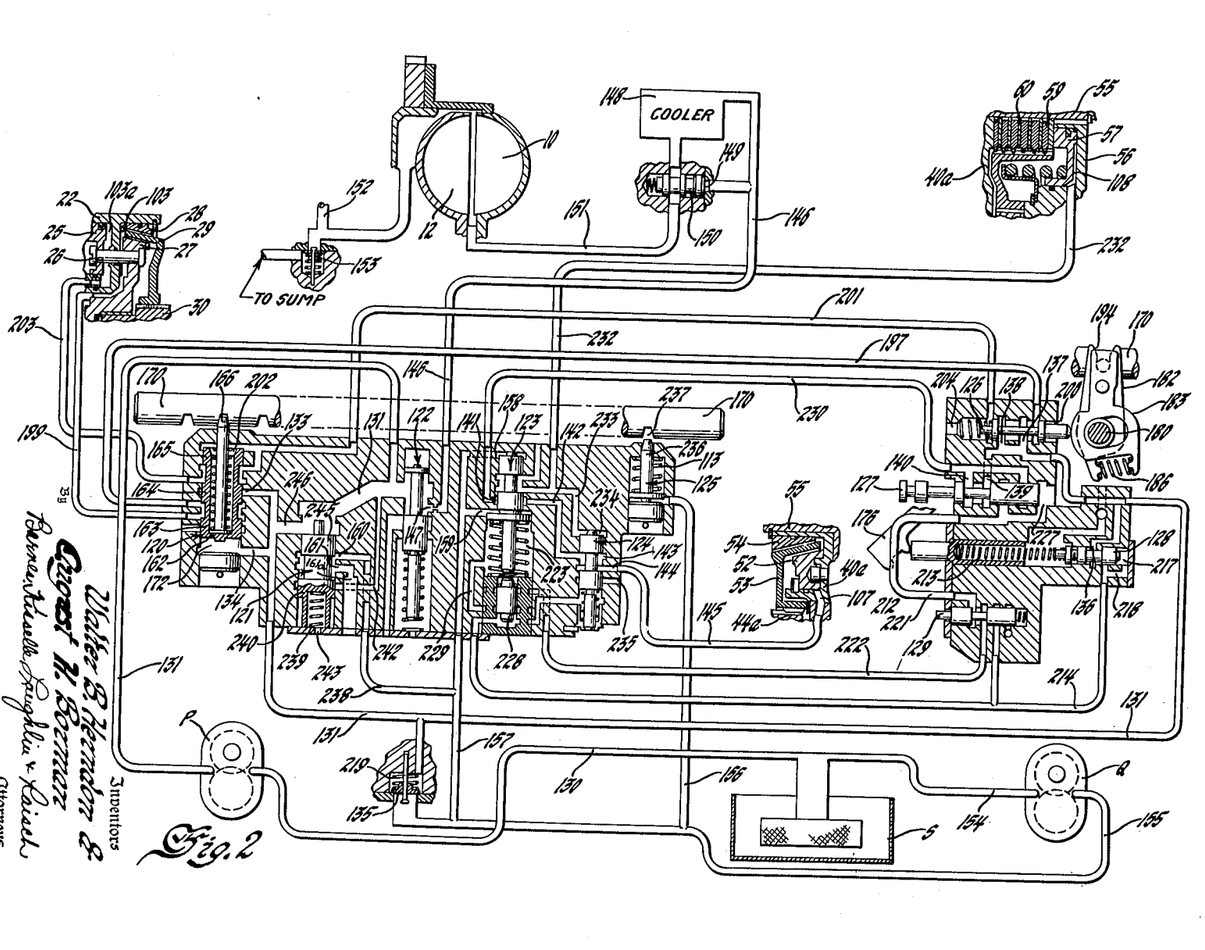
Fig. 2 is a diagrammatic layout showing the hydraulic system for the automatic transmission which is the subject of this invention.

Referring to Fig. 2, there is shown a schematic diagram of the transmission hydraulic control system which may be conditioned to provide continuous operation in second gear, drive range operation providing second gear start with automatic upshift to direct drive and forced downshift from direct drive back to second gear operation, or neutral, low and reverse.

The neutral, second speed, and direct drive clutches are all hydraulically operated and the application of the hydraulic pressure in the hydraulic system is controlled through a plurality of valves, namely, a combined shift rail blocker and neutral clutch valve 120, a tow valve 121, supply line pressure regulator valve 122, shift valve 123, transition or timing valve 124, reverse inhibitor valve 125, neutral clutch control valve 126, manual valve 127, throttle valve 128, and detent or forced downshift valve 129. The upper head of the pressure regulator valve 122 (Fig. 3) has a port in it so that the valve is hydraulically unbalanced and moves by hydraulic pressure against the spring as shown.

Engine driven pump P draws oil from transmission sump S by way of passage 130 and delivers fluid under pressure through passage 131 to line pressure regulator valve 122. Line pressure supply passage 131 conducts pressure fluid to the top side of tow valve 121, to ports 133 and 134 of the combined shift rail blocker and clutch control valve 120, to one side of a rear pump check valve 135, to the pressure supply port 136 of throttle valve 128, to pressure supply ports 137 and 138 of neutral clutch valve 126, and to pressure supply port 139 of manual control valve 127. A pressure delivery passage controlled by manual valve 127 admits line pressure from port 139 to port 140 of the manual valve and through passage 230 to annular port 141 of shift valve 123. Passage 142 connects port 141 of the shift valve 123 to annular port 143 of transition valve 124. Port 144 of transition valve 124 is connected to intermediate clutch pressure supply passage 145.

Relating back to the pressure regulator valve 122, a passage 146 connected to port 147 of the pressure regulator valve conducts pressure fluid to an oil cooler 148 and to port 149 of an oil cooler by-pass valve 150. Oil from the oil cooler is conducted to the fluid coupling 10, 12 by way of passage 151. Passage 152 is a transmission lubrication oil supply passage which supplies oil to the transmission for lubricating purposes. A blow off valve 153 limits the pressure of the lubricating oil in passage 152.

Rear pump Q, driven by the vehicle load shaft 70 (Fig. 1) draws oil from sump S by way of suction passage 154, and delivers the same under pressure to supply passage 155. Passage 155 delivers oil under pressure to passage 156 and reverse inhibitor valve 125, to rear pump check valve 135, to passage 157 and ports 158 and 159 of shift valve 123 and through line 238 to port 160 of tow valve 121. Port 161 of tow valve 121 exhausts to the transmission sump through the restricted orifice 161a, shown in Fig. 2.

Figure 5:
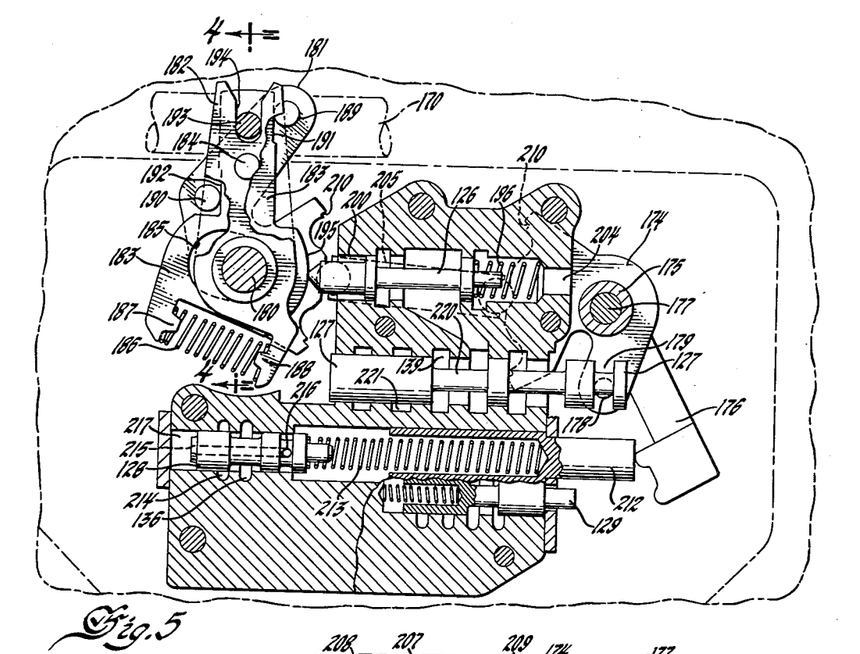
Fig. 5 is a section along the line 5—5 of Fig. 6.
Figure 6:
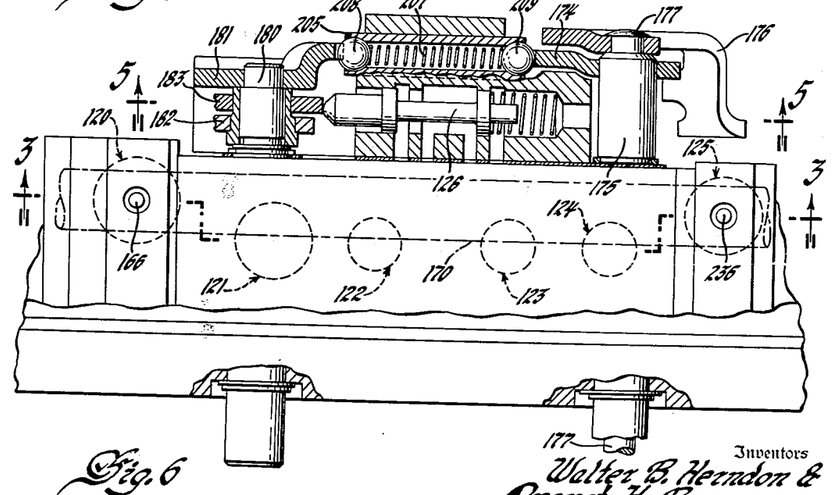
Fig. 6 is a top plan view partly in section showing the throttle lever, the hydraulic shift lever, the primary shift lever, the interlock between the primary shift lever and the hydraulic shift lever, and the neutral clutch valve.

Referring to Fig. 5, the manual valve 127 is in neutral position and can be shifted manually into drive position (Fig. 2), or into second speed position by a shift lever 174 herein designated a hydraulic shift lever because of the fact that when valve 127 is in drive position the transmission is automatically and hydraulically shifted from second to drive in response to the car speed and throttle conditions under which the engine is operating. Hydraulic shift lever 174 is fixed on rotatable tubular shaft 175. A throttle lever 176 is fixed on the end of a throttle shaft 177 which is journalled within shaft 175. Shift lever 174 is provided with a pin 178 which engages valve 127 in annular groove 179 to operatively connect the valve to shift lever 174. When valve 127 is in neutral position, then both the second speed clutch 52, 53, 54 and the third speed or direct drive clutch 59, 60 are disengaged whereas the neutral clutch 27, 28, 29 is engaged.

Figure 9:
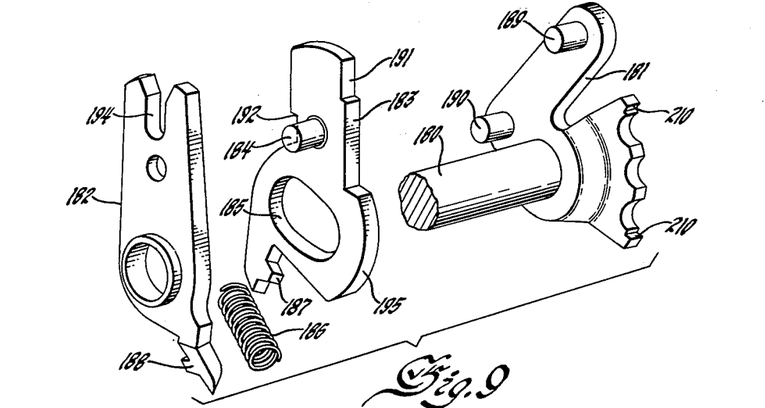
Fig. 9 is an exploded view of the shift relay mechanism.

With manual valve 127 in neutral position the transmission can be manually shifted into low and reverse by manually turning primary shift shaft 180 to the end of which is fixed primary shift lever 181. Referring to Fig. 9, a shift relay lever 182 is journalled upon the shaft 180. A shift relay cam 183 is pivotally supported adjacent its upper end by pin 184 on shift relay lever 182. Cam 183 is provided with an opening 185 through which shaft 180 passes. The major diameter of opening 185 is substantially greater than the diameter of shaft 180 so that cam 183 can pivot on pin 184 relative to shaft 180. A compression spring 186 is positioned between the lower ends of shaft relay lever 182 and cam 183 which are provided with projections 187 and 188 for holding spring 186 in position. Thus, spring 186 tends to hold apart the lower ends of lever 182 and cam 183 apart. Lever 181 has fixed thereon pins 189 and 190. Pin 189 is adapted to engage cam 183 in notch 191 and pin 190 is adapted to engage cam 183 in notch 192. Thus, pins 189 and 190 straddle cam 183 (Fig. 5).

Shift rail 170 has fixed thereto a pin 193 which interengages lever 182 in notch 194. Cam 183 is provided with an arcuate cam surface 195 which contacts the end of neutral clutch control valve 126. Spring 196 biases valve 126 against cam 195.

Figure 3:
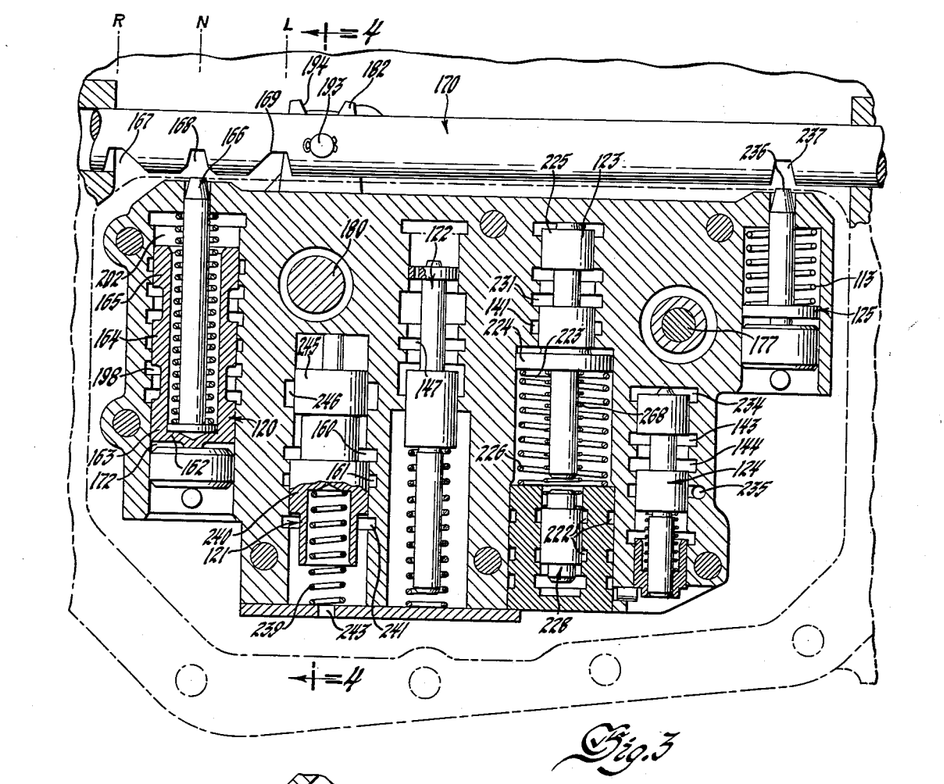
Fig. 3 is a sectional view showing the valves and shift rail for the hydraulic system taken along the line 3—3 of Fig. 6.
Figure 4:
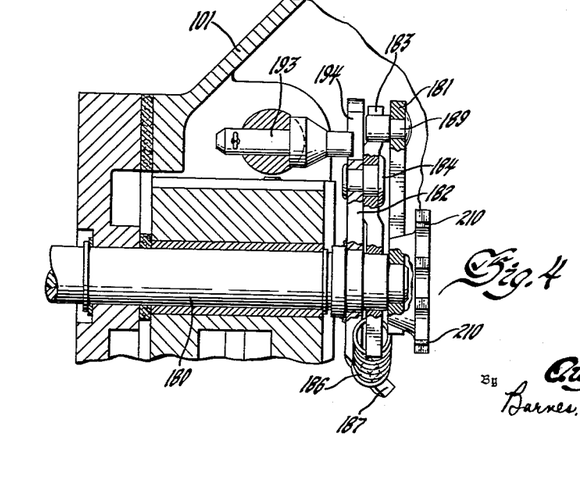
Fig. 4 is a partial section along the line 4—4 of Fig. 3. This view is also taken along the line 4—4 of Fig. 5.
Figure 7:
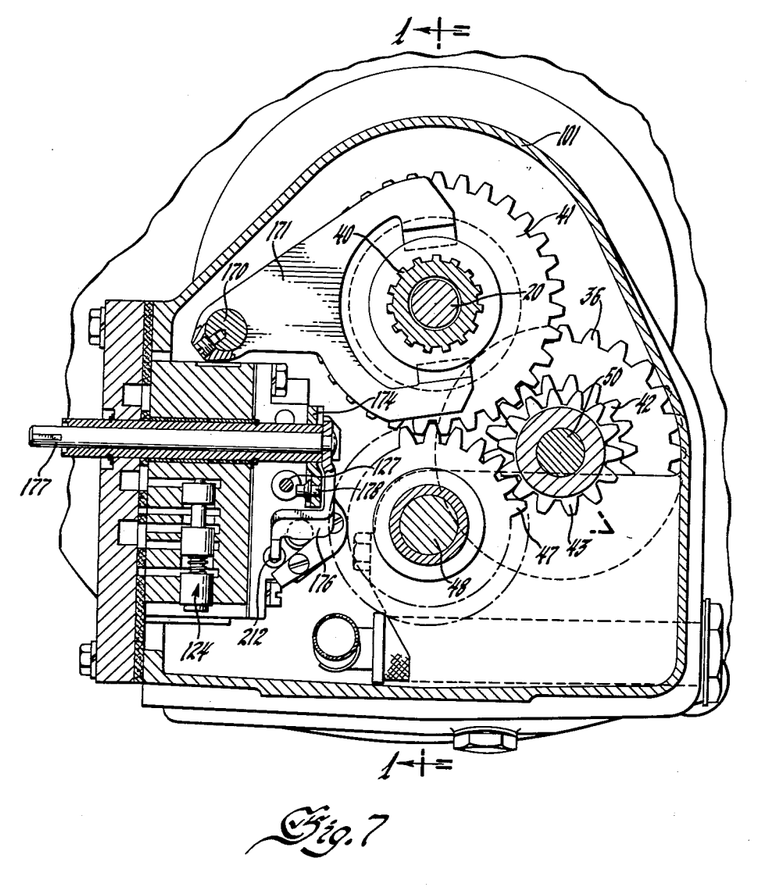
Fig. 7 is a sectional view taken along the line 7—7 of Fig. 1.

In order to permit engagement of the low and reverse gear 41 (Fig. 1) with either low gear 42 or reverse idler gear 47 without gear clash, it is necessary that header input gear 31 (Fig. 1) be permitted to cease rotation at the same time that axial movement of low and reverse gear 41 on shaft 40 is accomplished. This result is obtained by means of the combined shift rail blocker and clutch control valve 120 and the neutral clutch control valve 126. Referring to Fig. 3, shift rail blocker comprises a piston 162 having lands 163, 164 and 165 joined by reduced stem portions. A pin 166 carried by piston 162 extends outwardly from the piston bore to interengage one of notches 167, 168, 169 in the shift rail 170 to lock or dog the shift rail against axial motion. The shift rail 170 is pinned to the shifter yoke 171 (Figs. 1, 7) for accomplishing axial motion or shifting of gear 41 in response to lateral or axial motion of shift rail 170. So long as pin 166 engages any one of notches 167, 168, 169 in shift rail 170, lateral motion of the shift rail is prevented. As long as valve 126 is in the position shown in Figs. 2 and 5 with the shift relay cam 183 retracted, line pressure in passage 131 is continuously supplied to chamber 172 beneath piston 162 to normally bias the piston and pin 166 toward rail 170 and lock the rail in neutral, low or reverse position.

As shown in Fig. 5, primary shift lever 181 is in neutral position and relay cam 183 is retracted so that neutral clutch valve 126 is in the position so that the neutral clutch is engaged, the outlet side of pump P being connected through lines 131 (Fig. 10), neutral valve 126, line 197, annular groove 198 (Fig. 3) between lands 163 and 164 of valve 120, and line 199 (Fig. 2) with chamber 103 so that line pressure from pump P acts against sleeve 22 and holds the neutral clutch 27, 28, 29 engaged. As long as the neutral clutch is engaged, gears 31, 36 and low gear 42 and reverse gear 43 rotate.

Figure 8:
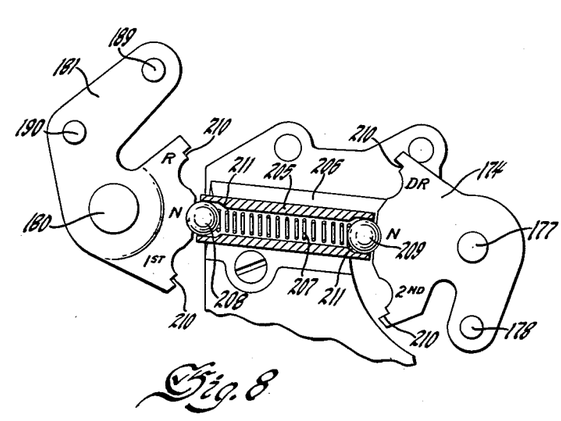
Fig. 8 is a detail of the interlock between the primary and hydraulic shift levers.

To shift into low gear, primary shift lever 181 is rotated counterclockwise (Figs. 5 and 8). Since the shift rail blocker pin 166 is interengaged with the neutral notch 168 in shift rail 170 (Fig. 10), rail 170 and its pin 193 cannot move or shift longitudinally. Referring to Fig. 5, as lever 181 moves counterclockwise, pin 189 contacts shift relay cam 183 in notch 191 and rotates cam 183 counterclockwise about pivot pin 184. During this movement pin 193 becomes the reaction point. As relay cam 183 rotates counterclockwise, it swings from the retracted position, shown in Figs. 2 and 5, to the projected position, shown in Fig. 10, to thereby shift neutral clutch valve 126 to the left, Figs. 2 and 10, so that line 197 is exhausted through outlet 200 to the sump and main line pressure from pump P is admitted from line 131 through valve 126 and line 201 into the valve cavity 202 above piston valve 162, Fig. 3. At the same time main line pressure is admitted through line 203 into sleeve 22 in the area 103a between piston 25 and sleeve 22, thus disengaging the neutral clutch 27, 28, 29 and also retracting pin 166 from notch 168. Shift rail 170 and pin 193 are now free to move axially.

Figure 10:
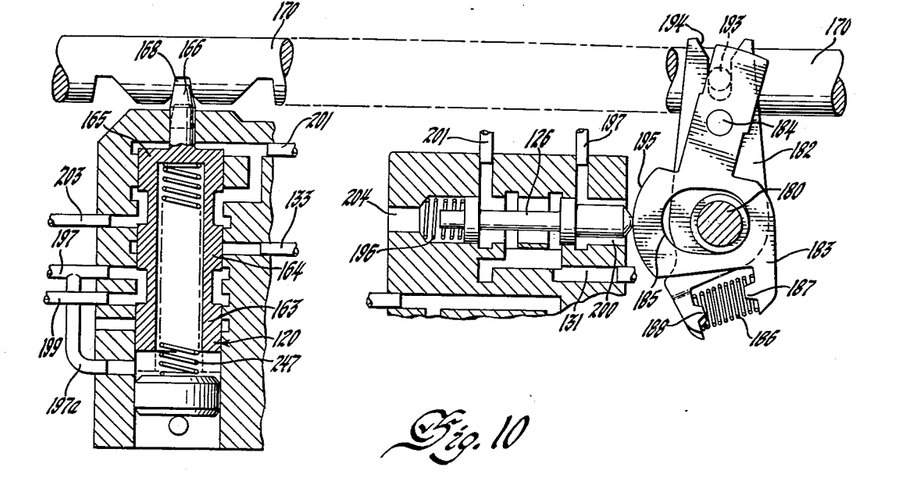
Fig. 10 is a sectional view of a modified form of shift rail blocker and neutral clutch valve shown with the shift relay mechanism.

As soon as the shift lever blocker pin 166 is retracted from notch 168, then pin 184 becomes the reaction point for the counterclockwise torque exerted by primary shift lever 181 through pin 189 upon shift relay cam 183. In shifting to first speed the turning effort or torque from primary shift lever can only be communicated to pin 193 through pin 189, relay cam 183, pivot pin 184, and shift relay lever 182. Since pin 193 is held stationary or blocked against movement by shift rail blocker pin 166, relay cam 183 rotates counterclockwise about pin 184 (Fig. 5) from retracted position to projected position, which is shown in Fig. 10, and simultaneously shifts valve 126 to a position where main line pressure now disengages the neutral clutch 27, 28, 29 and also retracts shift rail block pin 166. This now frees pin 193 for axial movement. Spring 186, which was compressed, is now free to expand thereby retracting shift relay cam 183 from its projected position (Fig. 10) to its retracted position (Fig. 5) so that spring 196 moves neutral valve 126 to the position shown in Figs. 2 and 5 which again admits line pressure to line 197 thereby reengaging neutral clutch 27, 28, 29 and exhausting line 201 to the sump through port 204 so that line pressure can act against the lower end of piston 120 and again cause shift rail blocker pin 166 to engage shift rail 170 in notch 169 to lock the rail in low speed. Before the pressure builds up in line 199 to reengage neutral clutch and set the low gear 42 in rotation, rail 170 will have acted through yoke 171 to shift the low and reverse gear 41 into engagement with low gear 42. In shifting to low as soon as pin 166 is released from shift rail 170, notch 168, then the turning effort exerted by pin 189 against shift relay cam 183 is transmitted through pin 184 to shift relay lever 182 thereby shifting the rail to the left, Fig. 3, spring 186 serving as the reaction point and serving to transmit the turning effort from the lower end 187 of the shift relay cam 183 to the lower end 188 of the shift relay lever 182. Spring 186, which was compressed by counterclockwise rotation of shift relay cam 183 in the above operation when pin 193 held lever 182 against rotation on shaft 180, now acts to rotate shift relay cam 183 clockwise about pin 184 from the projected position shown in Fig. 10 to its retracted position. Thus, spring 186 recovers the lost motion in the shift relay mechanism, but shifting of the rail 170 is effected substantially manually although spring 186 contributes a small fraction to the travel of the rail. Thus, the net effect of the shift relay mechanism 181—183 is that it conditions the hydraulic system so that the low and the reverse gears 42, 47 are always torque free before the low and reverse gear 41 is shifted into mesh with either the low or the reverse gear, thus avoiding any gear clash.

In shifting into reverse the primary shift lever 181 is rotated clockwise, Fig. 5, and pin 190, instead of pin 189, transmits the turning action to shift relay cam 183 and the operation of the shift relay mechanism 181—182 is the same as above described for shifting into low or first gear.

Referring to Fig. 8, an interlock is provided between hydraulic shift lever 174 and primary shift lever 181 so that neither lever can be rotated unless the other is in neutral position. This interlock comprises a cylindrical sleeve 205 axially slidable in support 206. A compression spring 207 is housed within sleeve 205 and the ends of the compression spring bear against ball detents 208 and 209 carried in the ends of sleeve 205. The ball detents co-act with sockets designated DR (drive), N (neutral), "second" in lever 174 and sockets designated R (reverse), N (neutral) and "first" in primary shift lever 181. When each of the levers are in neutral position, as shown, sleeve 205 is in neutral position with its ends spaced from levers 174 and 181. If lever 174 is shifted to drive position, then shoulder 210 engages the right hand end of sleeve 205 and blocks this sleeve against movement to the right. While hydraulic shift lever 174 is in drive position, as just described, primary shift lever 181 cannot be turned because ball 208 will bottom against its seat 211 in sleeve 205 while still interengaged with the neutral socket in lever 181 and thus positively lock lever 181 against rotation. Hydraulic shift lever 174 is provided with a similar shoulder 210 for second speed position and primary shift lever is provided with a shoulder 210 for each of reverse and first positions. As long as any shoulder 210 of either shift lever is engaged with the end of interlock sleeve 205, the other lever must be in neutral position and cannot be shifted out of neutral position.

The throttle lever 176 acts through plunger 212 and spring 213 (Fig. 5) to regulate the pressure in line 214 to some pressure less than line pressure obtaining in port 136. This is called TV or throttle valve pressure. Valve 128 is provided with a longitudinal bore 215 which extends from its left hand end to port 216. Line 214 connects with the valve chamber 217 through branch line 218 (see Fig. 2). Thus TV pressure in chamber 217 is always acting against valve 128 and spring 213. Whenever the TV pressure in line 214 falls below a given pressure (some pressure less than line pressure), then spring 213 moves valve 128 outwardly connecting line 131 through port 136 with line 214, thus increasing the pressure in chamber 217 until the load of spring 213 is balanced, whereupon valve 128 has moved sufficiently to the left (Fig. 2) or to the right (Fig. 5) to cut off line 214. Thus valve 128 will open line 131 to line 214 whenever the TV pressure falls below the balancing pressure and will close off line 131 from line 214 as long as the pressure in line 214 is the balancing pressure.

Check valve 135 separates the rear pump pressure Q in line 155 from the front pump P pressure obtaining in line 131. Valve 135 will only lift off its seat when the pressure in line 155 exceeds the line pressure in line 131 plus the pressure of spring 219 which holds check valve 135 against its seat.

If it is desired to operate the transmission continuously in second gear, then hydraulic shift lever 174 is rotated clockwise (Figs. 5 and 8) until the second speed notch interengages ball detent 209. In this position of lever 174 manual control valve 127 is shifted to second speed position which admits line pressure from line 131 through port 139 into the valve chamber around the reduced section 220 of valve 127 into line 221 by detent valve 129 into line 222 which communicates with valve chamber 223 of shift valve 123 beneath land 224 (Fig. 3). The top side of land 224 and the top side of land 225 of valve 123 are subjected to liquid pressure created by rear pump Q through lines 155, 157 and 158 which is a lesser pressure when the engine is running than the pressure generated by pump P and present in valve chamber 223 beneath land 224. The line pressure in chamber 223 is also reinforced by the pressure of compression spring 226 which acts on land 224 and tends to keep valve 123 in second speed position. When the hydraulic shift lever 174 and valve 127 are in drive position, then line 221, as shown in Fig. 2, is exhausted to sump S through port 227 but line 214 communicates with shift valve chamber 223 by valve 228 and line 229. Hence, in drive condition only TV pressure and spring 226 are acting on the underside of land 224 and tending to keep the transmission in second speed in opposition to the pressure from pump Q which acts on the top sides of lands 224 and 225. When the vehicle attains sufficient speed so that the pressure generated by pump Q and acting against the top of lands 224 and 225 is greater than the combined TV pressure in chamber 223 and spring 226, then valve 123 shifts downwardly from the position shown in Figs. 2 and 3, whereupon the line pressure in line 230, which communicates with port 141, is transmitted to port 231 (Fig. 3) and thence to line 232 which engages the direct drive clutch 59, 60 thereby placing the transmission in direct drive so that the drive is from shaft 20 through clutch 59 and 60 to shaft 70. When shift valve 123 is shifted downwardly to direct drive position, then line pressure is also admitted through line 233 into valve chamber 234 above valve 124 (Figs. 2 and 3), whereupon transition valve 124 shifts downwardly closing line 142 and exhausting line 144 through exhaust port 235 to the sump thereby permitting second speed or intermediate clutch to disengage. Also as shift valve 123 shifts downwardly to direct drive position, the effective pressure of spring 268, Fig. 3, is increased and this spring acts on valve 228 thereby moving valve 228 downwardly and closing off TV pressure line 214 from line 229 and valve chamber 223 and valve chamber 223 is now exhausted to the sump through line 222, by detent valve 129 and through line 221.

If the transmission is in direct drive and additional torque is desired, then the accelerator pedal is pushed toward the floor of the vehicle thereby shifting detent valve 129 to the right (Fig. 2) which causes the TV pressure in line 214 to communicate through line 222 with the underside of land 224 of shift valve 123 thereby raising the shift valve to its upper or second speed position, providing vehicle speed is low enough that governor pressure allows valve to move up, which disengages the direct drive clutch 59, 60 and engages the second speed clutch 52, 53, 54, thereby applying a greater torque to the rear wheels by means of second gear.

*Reverse inhibitor.*—Whenever the vehicle is in motion, pressure from pump Q is communicated through lines 155 and 156 into the valve chamber beneath piston 125 thereby compressing spring 113 and holding the reverse inhibitor pin 236 interengaged with notch 237 in shift rail 170. Hence, rail 170 cannot be axially moved to shift the transmission into low or reverse gear as long as the vehicle is rolling above a predetermined speed, thus protecting the reverse and the low and reverse gears of the transmission.

*Tow start.*—If the engine is dead and it is desired to start the engine by towing the same, then hydraulic shift lever and manual valve 127 should be shifted to drive or second speed position. As the vehicle is towed, pump P will not be in operation but pump Q will be in operation thereby creating hydraulic pressure in lines 155, 157 and 238. Since pump P is inoperative there will be no line pressure in line 131 and consequently valve 121 will be in raised position (Fig. 3). Fig. 2 shows the tow valve in lowered position.

In the absence of line pressure acting against the top side of valve 121, spring 239 raises the tow valve to its up position so that the lower land 240 of the tow valve now clears port 241 so that the line pressure from line 131 is bled through line 242 (Fig. 2), through port 241 into the tow valve chamber and thence through port 243 (Fig. 3) to the sump. The tow valve acts as a pressure regulator to hold the tow pump pressure to a desired pressure which, for example, may be about sixty pounds per square inch. The lower land 240 of tow valve 121 has a greater diameter than the upper land 245. Thus the pressure from pump Q acting on top of lower land 240 is counterbalanced and overcome by the pump pressure acting on the lower side of land 245 combined with the force of spring 239. Thus, tow valve 121 becomes a pressure regulating valve. The regulated pressure can, of course, be varied by selection of the strength or force exerted by spring 239 against valve 121. The higher the strength of spring 239 the greater the pressure developed by pump Q in lines 155 and 238, which communicates with port 160, before valve 121 will move downwardly and connect port 160 with bleed port 161 which occurs whenever the predetermined or desired pressure is reached in line 238.

When the engine is dead, the pressure regulating valve 122 is not in operation and is held in its uppermost position so that port 147 is closed. The tow valve in its raised or towing position closes port 161 and restricted orifice 161a and so converts the rear pump Q from a governor to a pressure pump. As the speed of the vehicle increases the pressure from pump Q increases until check valve 135 opens admitting the pressure from pump Q into line 131. However, tow valve in raised position closes port 246 (Fig. 2), but fluid under pressure passes by manual valve 127 into line 230. The pressure from pump Q acts through lines 157 and 158 to move shift valve 123 downwardly which admits fluid under pressure from line 230 through line 233 to transition valve 124 which shifts downwardly to exhaust line 145 and to disengage the second speed or intermediate clutch and at this time fluid pressure is also admitted to line 232 to engage the third speed or direct drive clutch so that the drive is communicated from the rear wheels through shaft 70, direct drive clutch 59, 60, shaft 20, through the damper 16, to the flywheel 2 and crankshaft 1. This turns the engine over and as soon as the engine is set in operation fluid pressure from the pump P again creates pressure in line 131 which sets the pressure regulating valve 122 in operation, causes the tow valve to move downwardly to the position shown in Fig. 2, thereby shutting off the bleed line 242 and port 241 and the operation resumes as above set forth. Pump Q now resumes its role as a governor controlling the position of shift valve 123 for either second speed or direct drive operation.

Fig. 10 shows a modified and preferred form of the shift rail blocker and neutral clutch control valve. In this form of the invention the spring 247, supplemented by line pressure through line 197a, acts on the underside of valve 120 tending to raise the same and hold the shift rail blocker pin 166 interengaged with the shift rail 170. When the neutral clutch control valve 126 is shifted to the left (Fig. 2) while shifting into low or reverse gear, line 197 is exhausted through port 200 and line pressure from 131 is admitted into lines 201 and 203 which, as above described, acts first to release the neutral clutch and also acts against the top side of control valve 120 to lower the same and withdraw pin 166 from its notch in shift rail 170 after the neutral clutch is disengaged. In this modified form of the device the spring 247 opposes the line pressure from line 201 acting against the top face of valve 120.

Figure 11:
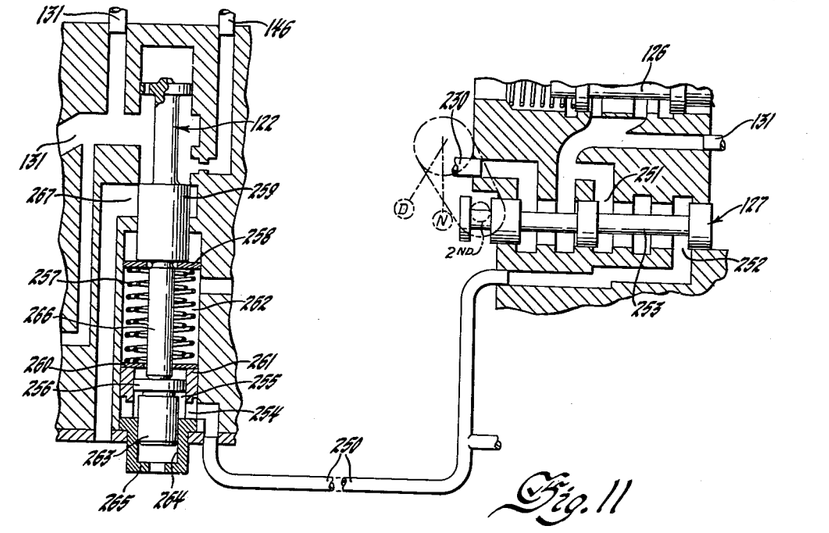
Fig. 11 is a sectional view of a modified form of pressure regulating valve arranged so that line pressure is also admitted beneath pressure regulating valve when the manual valve is in second speed position.

When the vehicle overruns the engine, it is sometimes desired to use the engine as a brake. For this overrun braking, it is preferable to shift the transmission into second gear whereupon the output shaft 70 is connected with the engine crankshaft 1 through second speed clutch 52, 53, 54, the second speed gear 44, the countershaft gears 36 and 37, header gear 31, neutral clutch 27, 28, 29, shaft 14 and the fluid coupling. To insure sufficient pressure to hold the second speed clutch engaged during second gear overrun braking, there is shown in Fig. 11 a modified arrangement of the pressure regulating valve which increases or maintains sufficient line pressure during such second gear overrun braking to insure engagement of the second speed clutch. The modified arrangement of pressure regulating valve also acts to increase or maintain sufficient line pressure whenever the transmission is in second speed drive range with the throttle wide open. In this arrangement, referring to Fig. 11, when the manual valve 127 is in second speed position as shown, line 131 communicates with line 250 through ports 251 and 252 which are now in communication about the reduced center 253 of valve 127. Line 250 communicates through port 254 with cylinder 255 beneath piston 256. Pressure regulator valve 122 is backed up by a pair of compression coil springs 257 instead of a single spring as in the principal form of the invention. Springs 257 act at their upper ends against a washer 258 fixed to regulating valve 122 in a groove at the lower end of land 259. The lower ends of springs 257 rest upon a plate 260 mounted upon a fixed support ring 261 in chamber 262. The stem 263 of piston 256 is guided in cylinder 264. Bottom 265 of cylinder 264 is positioned with respect to port 254 so that when stem 263 rests upon bottom 265, piston 256 does not completely close port 254. Hence, fluid under pressure from line 254 is always available beneath piston 256 whenever valve 127 is in second speed position. This fluid at line pressure acts upwardly against the under side of valve 256 which abuts the lower end of valve stem 266. Thus, line pressure acts against piston 256 and cooperates with the springs 257 to yieldably urge pressure regulating valve 122 upwardly where it tends to close bleed port 267 and thus raise the effective pressure in lines 131, 230 and 145 sufficient to hold second speed clutch 52, 53 and 54 engaged to effect overrun braking. Still referring to Fig. 11, when manual valve 127 is shifted to neutral or drive position, then line 250 is bled through port 252 into the sump S thus exhausting the fluid from cylinder 255 beneath valve 256.

We claim:

1. In a transmission, at least two gears, one of which is shiftable into meshing relation with the other, a source of power including a hydraulically actuated clutch, having actuating means, for driving one of said gears, a fluid system including pump means for pumping liquid under pressure and first and second valves for controlling said clutch, a shift rail actuatable to shift said shiftable gear, said first valve being normally positioned to admit liquid under pressure to said second valve and said second valve being normally positioned to admit liquid under pressure to one side of said actuating means for engaging the clutch, said second valve also being provided with means for normally interlocking with said shift rail whereby the shift rail is latched in position, said system including fluid lines connecting said first and second valves whereby when said first valve is shifted fluid under pressure is admitted to said second valve to shift the same to withdraw the locking means from said shift rail and simultaneously exhaust the liquid under pressure from the one side of said actuating means and to admit liquid under pressure to the other side of said actuating means to disengage the clutch whereby said driven gear is disconnected from its source of power preparatory to meshing said gears.

2. The combination defined in claim 1 including a shift relay mechanism between said shift rail and first valve which relay mechanism is actuatable first to shift the first valve to admit fluid pressure to the second valve and actuating means for disengaging the clutch and withdrawing said interlocking means from the shift rail to release said shift rail for subsequent shifting by further actuation of said shift relay mechanism.

3. The combination defined in claim 2 wherein said shift relay mechanism comprises a rotatable shaft, a driving lever fixed on said shaft, a driven lever journalled on said shaft, a relay lever pivoted on said driven shaft and operatively associated with said first valve, a driving connection between said driving lever and said relay lever whereby when the shaft is rotated to swing said driving lever said driving lever swings said relay lever about its pivot to shift said first valve.

4. The combination claimed in claim 3 including means for returning said first valve and relay lever to their initial position when the shift rail interlocking means is withdrawn.

5. Shift relay mechanism comprising a rotatable shaft, a driving lever fixed on said shaft, a driven lever journalled on said shaft for operating a shift mechanism, a relay lever pivoted on said driven lever on an axis radially spaced from the axis of the shaft, a driving connection between said driving lever and said relay lever radially removed from the pivot of the relay lever, whereby when the shaft is rotated to swing said driving lever said driving lever swings said relay lever about its pivot on the driven lever.

6. The combination defined in claim 5 including resilient means acting between said driven lever and relay lever tending at all times to resist turning of said relay lever on said driven lever in response to turning effort applied by said driving lever to said relay lever.

7. The combination defined in claim 6 including a shiftable member connected to said driven lever, a dog for dogging said shiftable lever against shifting, a hydraulic motor for controlling said dog, a passageway supplying fluid pressure to said motor, a valve in said passageway normally closing the same, an operative connection between said valve and relay lever whereby turning effort on said shaft causes said relay lever to shift said valve to admit fluid under pressure to said hydraulic motor which responds to withdraw said dog from said shiftable member whereupon said shiftable member can be shifted by rotation of said driven lever, said resilient means acting between said driven lever and relay lever to retract said relay lever after the dog is disconnected from said shiftable member whereby said valve is free to return to its starting position.

8. The combination defined in claim 7 including a clutch having hydraulically actuated means, a passageway for conducting liquid under pressure to said means for engaging the clutch, a valve in said passageway actuated by said hydraulic motor for cutting off said fluid passageway from its source of fluid under pressure and opening the passageway to exhaust simultaneously with the withdrawing of said dog out of interengagement with said shiftable member whereby said clutch is disengaged preparatory to shifting said shiftable member.

9. The combination defined in claim 8 including driven and driving gears, said driven gear being adapted to be shifted into mesh with the driving gear, means including said clutch for driving said driving gear, a driving connection between said shiftable member and said shiftable gear whereby said clutch is disengaged preparatory to shifting said gears into mesh.

10. In a gear transmission, a power input shaft, first and second gears relatively shiftable into and out of mesh, a hydraulically actuated clutch, with actuating means, connecting said power input shaft with one of said gears, a shift rail connected to one of said gears for shifting the same into and out of mesh with the other gear, a source of fluid under pressure, a passageway connecting said source of fluid with said actuating means for engaging the clutch, first and second valves in said fluid line, said valves being normally open to admit fluid under pressure to said actuating means to engage the clutch, a second passageway extending from said first valve to said second valve whereby when said first valve is shifted fluid under pressure is admitted through said second passageway to said second valve to shift the same to close off said first fluid pressure passageway and exhaust the fluid pressure from said actuating means to disengage the clutch, a dog normally engaged with said shift rail and mounted on said second valve whereby shifting of said second valve to closed position in response to fluid pressure withdraws said dog from said shift rail and the shift rail can be shifted to shift said gears into engagement after the one gear has been disconnected from the power input shaft.

11. The combination defined in claim 10 wherein the first valve is manually shiftable from its normally open position to the position wherein it admits fluid under pressure to said second passageway, and resilient means for returning said first valve to its normally open position.

12. The combination defined in claim 11 including a shift relay mechanism for manually shifting said first valve, comprising a rotatable shaft, a driving lever fixed on said shaft, a driven lever journalled on said shaft, a relay lever pivoted on said driven shaft, a driving connection between said driving lever and said relay lever whereby when the shaft is rotated to swing said driving lever said driving lever swings said relay lever about its pivot to shift said first valve to the position where it admits fluid under pressure to said second passageway to shift said valve and disengage said clutch.

13. In a variable speed gear transmission, a direct drive shaft, a power input shaft freely rotatable with respect to said direct drive shaft, a header gear, a hydraulically actuated neutral clutch for connecting said power input shaft to said header gear, a countershaft, a gear cluster mounted on said countershaft, one of said gears being in mesh with said header gear, a main shaft freely rotatable relative to said direct drive and power input shafts, an intermediate gear journalled on said main shaft and in mesh with one of the gears in said cluster, an output shaft, a fluid actuated intermediate clutch for connecting said intermediate gear with said power output shaft, and a direct drive fluid actuated clutch for connecting said direct drive shaft with said power output shaft, and fluid controls for engaging said neutral clutch and intermediate clutch and disengaging said direct drive clutch for second speed forward, and for disengaging said intermediate clutch and engaging said direct drive clutch for direct drive forward speed.

14. The combination claimed in claim 13 including a sliding low and reverse gear splined on said main shaft, said gear cluster including reverse and low gears, a reverse idler gear in mesh with said reverse gear of said cluster, and a shift relay mechanism for disengaging said neutral clutch preparatory to shifting said low and reverse gear into mesh with one of the low and reverse gears of said cluster whereby for low speed forward the low and reverse gear is in mesh with the low speed gear of the countershaft, the neutral clutch engaged, and the second speed and direct drive clutches disengaged.

15. In a transmission for an automotive vehicle, a driving gear and a driven gear therefor, said driven gear being shiftable into and out of meshing relation with said driving gear, a yoke operatively connected to said shiftable gear, a shift rail connected to said yoke and shiftable to shift said driven gear into mesh with said driving gear, a detent, a cylinder and piston, said detent being operatively connected with said piston, a fluid pump driven in accordance with the speed of the vehicle for supplying fluid under pressure to said cylinder to project said detent into interengagement with the shift rail to inhibit shifting thereof whenever the vehicle is moving above a predetermined speed, and resilient means for retracting said detent out of interengagement with said shift rail whenever the vehicle speed falls below said predetermined speed.

16. In a variable speed shiftable gear transmission, a power input shaft, a header gear, a hydraulically actuated clutch, having actuating means, between said header gear and power input shaft, a countershaft, a gear cluster on said countershaft including a gear in mesh with said header gear, a low and reverse gear shiftable into mesh with one of said gears in said cluster, a shift rail operatively connected to said low and reverse gear for shifting the same, a source of fluid under pressure, a plurality of passageways connecting said source of fluid pressure with said actuating means of the hydraulically actuated clutch, first and second valves controlling said passageways, a shift relay mechanism for actuating said first valve, a shift rail detent operatively connected to said second valve, said second valve being a piston type valve, said first valve in its normal position admitting fluid under pressure through one of the passageways to the second valve and said second valve in its normal position admitting said fluid under pressure to said actuating means to engage the clutch and holding said detent interengaged with said shift rail to block movement thereof, said shift relay mechanism being actuatable to shift said first valve whereby said first mentioned passageway is opened to exhaust to release the fluid from one side of said actuating means of the hydraulically actuated clutch and fluid under pressure is admitted to said other passageway about said piston valve into the other side of said actuating means of the hydraulically actuated clutch to disengage the same and disconnect said header gear from said power input shaft and simultaneously said fluid pressure shifts said piston valve to retract said detent whereby further actuation of said shift relay mechanism shifts said rail and moves said low and reverse gear into engagement with one of the gears of said cluster.

17. The combination defined in claim 16 including resilient means for returning said first and second valves to their normal position to reengage said clutch and block said shift rail as soon as the shifting of said low and reverse gear is effected.

18. The combination claimed in claim 17 wherein said shift relay mechanism comprises a rotary shaft, a primary shift lever fixed on said shaft, a shift relay lever journalled on said shaft, a shift relay cam pivotally supported intermediate its ends upon said shift relay lever and operatively associated with said first valve, said primary shift lever having abutments contacting said shift relay cam on opposite sides of, and above and below, its point of pivoting, resilient means biasing the adjacent ends of said shift relay cam and lever apart, and a pin on said shift rail interengaging said shift relay lever whereby when the shift rail is blocked against movement rotation of said primary lever acts to swing said shift relay cam about its point of pivoting to shift said first valve whereupon release of the shift rail blocker is effected and further rotation of the primary shift lever is effective to shift said shift rail and its associated low and reverse gear.

References Cited in the file of this patent

UNITED STATES PATENTS

| | | |
|---|---|---|
| 2,086,600 | Burtnett | July 13, 1937 |
| 2,193,267 | Burtnett | Mar. 12, 1940 |
| 2,233,790 | Linsley | Mar. 4, 1941 |
| 2,247,478 | Burtnett | July 1, 1941 |
| 2,466,318 | Kohr | Apr. 5, 1949 |
| 2,479,183 | Peterson et al. | Aug. 16, 1949 |
| 2,609,900 | Neracher et al. | Sept. 9, 1952 |
| 2,615,349 | Winther | Oct. 28, 1952 |